(12) United States Patent
Keeley (10) Patent No.: US 6,833,842 B2
(45) Date of Patent: Dec. 21, 2004

(54) QUANTITATIVE DECISION SUPPORT PROGRAM

(76) Inventor: Thomas M. Keeley, 1040 Thornridge Ct., Brookfield, WI (US) 53045

( * ) Notice: Subject to any disclaimer, the term of this patent is extended or adjusted under 35 U.S.C. 154(b) by 128 days.

(21) Appl. No.: 10/001,738

(22) Filed: Oct. 25, 2001

(65) Prior Publication Data

US 2002/0038321 A1 Mar. 28, 2002

Related U.S. Application Data

(63) Continuation-in-part of application No. 09/770,843, filed on Jan. 26, 2001, and a continuation-in-part of application No. 09/580,813, filed on May 26, 2000.

(51) Int. Cl.[7] ............................................... G09G 5/00
(52) U.S. Cl. ........................ 345/637; 345/711; 345/712; 707/102
(58) Field of Search ................................. 345/637, 711, 345/712; 707/102

(56) References Cited

U.S. PATENT DOCUMENTS 6,426,761 B1 * 7/2002 Kanevsky et al. .......... 345/788
2002/0059272 A1 * 5/2002 Porter ........................ 707/100

* cited by examiner

*Primary Examiner*—Adam Arnold
(74) *Attorney, Agent, or Firm*—Quarles & Brady LLP

(57) ABSTRACT

A word processing tool for idea generation represents text-identified ideas of a database in either the form of a text outline or in the form of a tree structure of nodes. Ideas of a given level can be assigned weight values to change the ordering of the depiction of ideas in those levels. The weight values can be combined according to the hierarchy of the ideas in the tree to provide quantitative guidance to the user.

19 Claims, 8 Drawing Sheets

Rational Decisions Analysis

Issue: ⟵132

Should I buy a new car?

Analysis: ⟵144

Based on the weighted data provided, a positive opinion is identified with an accumulated value of 65.42. However, some of the positions are totally unsupported. If these positions are discarded then a positive opinion is identified with an accumulated value of 15.08.

Details: ⟵156

This Issue has 2 supporting positions and 2 objecting positions.

Supporting Positions:
"O01+: A New Car would make me Happy" has no supporting or objecting arguments leaving the value at 50.34. "O01+: New cars are safer" has strong supporting and low objecting argument(s) adjusting the value from 75.31 to 64.23.

Objecting Positions:
"O01-" New Cars are more likely to be stolen" has medium supporting argument(s) adjusting the value from 50.35 to 15.52. "O01-: new cars are expensive" has strong supporting and medium objecting arguments(s) adjusting the value from 50.36 to 33.63.

QUANTITATIVE DECISION SUPPORT PROGRAM

CROSS-REFERENCE TO RELATED APPLICATIONS

This application in a continuation in part of U.S. application Ser. Nos. 09/770,843 filed Jan. 26, 2001 and 09/580,813 filed May 26, 2000.

STATEMENT REGARDING FEDERALLY SPONSORED RESEARCH OR DEVELOPMENT

BACKGROUND OF THE INVENTION

The present invention relates to programs for assisting in the decision making process and in particular to program that organizes idea in either a text outline or a tree-diagram of issues, positions, and arguments and that allows quantitative weighting of each to provide quantitative explanation.

Text documents are a convenient way to share ideas. Text is easily generated and edited using a word processor or the like, and easily communicated or stored in either electronic or paper form.

Unfortunately, the relationship between ideas, as expressed in text alone, is not always clear. To remedy this problem, it is common to impose an outline structure on text documents in which "subservient" ideas are placed in paragraphs indented and underneath paragraphs representing "dominant" ideas. Each paragraph may be numbered in a way that further illustrates this relationship. By using multiple levels of indenting, outlining allows an arbitrarily complex set of dominant and subservient text elements to be represented. The outlining process is supported by many word processors which allow the user to switch between an outline mode and a standard text mode and which automate the process of numbering outlined paragraphs.

Outlining is nevertheless limited in its ability to convey complex relationships between ideas. When many ideas are presented, related dominant ideas are often separated by many subservient ideas with the result that the relationship between the dominant ideas is obscured. Further, the indentation of paragraphs (or numbering) provides little additional information about the relationship between ideas beyond the relatively general relationships of dominance and subservience. Finally, the outlining process in itself provides little guidance to the user in organizing text or in generating ideas.

The parent application to this application describes a text-processing tool that operates in either a text outline mode or a tree structure mode to organize ideas, and which allows numeric priorities to be attached to the ideas of a common level in either the outline or tree, and redraws the outline or tree to comport with those priorities.

While the numeric priorities help in organizing the ideas, in complex charts or trees, it may be difficult to decide among competing ideas, even when the ideas are organized spatially and labeled as to priorities.

BRIEF SUMMARY OF THE INVENTION

The present invention provides a systematic way of combining assigned numeric priorities of ideas according to their hierarchy to provide a succinct quantitative decision or a selection among quantitatively tagged alternatives. By so combining the priorities of structured ideas to reach a single decision, the user is prompted to focus on the organization and ranking of the ideas that produced the decision and to evaluate their completeness and accuracy.

Specifically then, the invention provides a program for the organization of ideas using an electronic computer, the electronic computer having a user input device and a graphic display. When implemented in a personal computer the input devices may take the form of a mouse, keyboard, voice, etc and the output device may take the form of a graphic display. When implemented as an embedded computer, the input devices may take the form of any sensor device and the output device can be a display or any control signal. The program includes instructions executed on the electronic computer to accept text identified ideas from the user via the user input device and to accept at least one hierarchy instruction from the user via the user input device to relate the accepted ideas in dependencies. In an embedded solution, the input structure could be hard coded in the firmware and the sensors could be used to set the value of the arguments. Representations of the ideas are displayed organized into levels defined by the common dependencies and the user assigns numeric priorities to the ideas. The invention calculates priorities of at least one "upper" idea being the numeric priority of the upper idea modified by the priority of at least one "lower" idea subservient on the upper idea.

Thus it is one object of the invention to provide quantitative guidance to the user of the program that imports into top level ideas the values of the lower ideas on which the top level ideas rest, where the importing reflects both the priorities and the levels of the hierarchy and the hierarchical structure.

The upper idea may be a single proposition and the calculated priority may indicate whether the proposition is supported or not by the ideas subservient on that statement.

Thus, it is one object of the invention to provide numeric guidance for problems cast in the form of a single statement whose validity is being investigated Alternatively, the upper idea may be a set of propositions of equal rank in the hierarchy and the calculated priorities may indicate which proposition of the set is best supported by the lower ideas subservient on that statement.

Thus, another object of the invention is to allow numeric guidance for problems cast in the form of alternatives.

The user may provide an indication as to whether an idea is a supporting or opposing idea by identifying its polarity.

Thus, it is another object of the invention to allow a system for quantitative guidance where both "pro" and "con" justifications may be advanced.

The program may indicate quantitatively the amount of support an upper idea has only if the lower ideas subservient to the upper idea are indicated to be supporting or opposing ideas. Otherwise, the program may indicate quantitatively which of a set of upper ideas of equal rank is best supported.

Thus, it is one object of the invention to automatically select a particular problem formulation (the validity of a single proposition, vs. the most valid selection among propositions) depending on whether the user identifies opposing or supporting statements in the previous level of the hierarchy.

The calculated priorities (weights) of upper ideas may be determined by multiplying the weights of at least one upper idea by factors based on the priorities of lower ideas subservient to the upper idea. Numeric priorities may be percentages and the calculated priority may multiply the priority of at least one upper idea by the percentage numeric priority of the supporting lower ideas subservient to the upper idea and by one minus the percentage of the numeric priority of the opposing lower ideas.

Thus, it is an object of the invention to provide a simple mathematical basis for computing priorities.

The priorities of supporting and opposing lower ideas may be previously modified by the priorities of ideas subservient to the supporting and opposing lower ideas.

It is a further object of the invention to allow quantitative information to be extracted from complex multi-level hierarchical structures that are useful for some kinds of decision-making.

The calculated priorities for an upper idea may be based on the numeric priorities of the upper idea modified by the priority of at least one lower idea subservient to the upper idea, only when the lower idea subservient to the upper idea also has a subservient idea.

Thus, it is another object of the invention to provide two mechanisms for determining calculated priorities of upper ideas, one that provides less weight for unsupported ideas in the hierarchy.

The program may modify priorities entered by the user when two priorities having a common dependency are the same, by adding a small, predetermined increment to one of the priorities. This modification may be used only for situations that require a definite sorting order.

Thus, it is another object of the invention to provide for a sorting order that eliminates ties in the event of identical priorities being assigned.

The foregoing and other objects and advantages of the invention will appear from the following description. In this description, reference is made to the accompanying drawings, which form a part hereof, and in which there is shown by way of illustration, a preferred embodiment of the invention. Such embodiment and its particular objects and advantages do not define the scope of the invention, however, and reference must be made therefore to the claims for interpreting the scope of the invention.

DETAILED DESCRIPTION OF THE INVENTION

Figure 1:
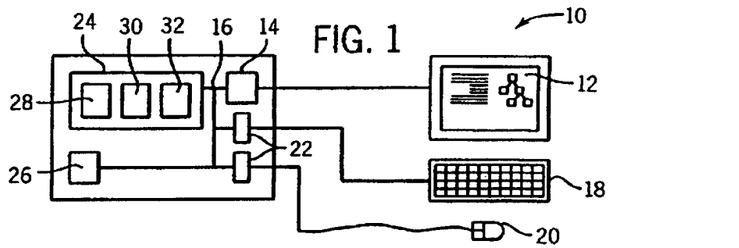
FIG. 1 is a block diagram of a standard desktop computer system showing a graphics display screen, a keyboard, and a mouse communicating with a processor and memory holding the program of one embodiment of the present invention.

Referring now to FIG. 1, in a first embodiment of the invention, a computer 10 may provide for a graphic display screen 12 such as a cathode ray tube or liquid crystal display monitor or the like communicating with a video card 14 attached to an internal bus 16 of the computer. A keyboard 18 and mouse 20 may likewise communicate via ports 22 with the internal bus 16.

The internal bus 16 also joins with a memory 24 and a processor 26 to allow intercommunication therebetween. The memory 24 may include an operating system 28, the program 30 of the present invention, and a database 32 created by the program 30 as will be described. The operating system may be, for example, a Windows operating system manufactured by Microsoft Corporation as is well known in the art. Generally, as will be described, the program 30 will be executed by the processor 26 in the environment of the operating system 28 to provide signals to the video card 14 for the display of data on the graphic display screen 12 and receive data from the user through the keyboard 18 and mouse 20. The program 30 may be written in a graphical object-oriented language such as Visual Basic, Delphi or C++, such languages which provide high level objects for "buttons", "text boxes" and similar objects as well as database structures as will be described below.

The Entry of Hierarchical Ideas

Figure 2:
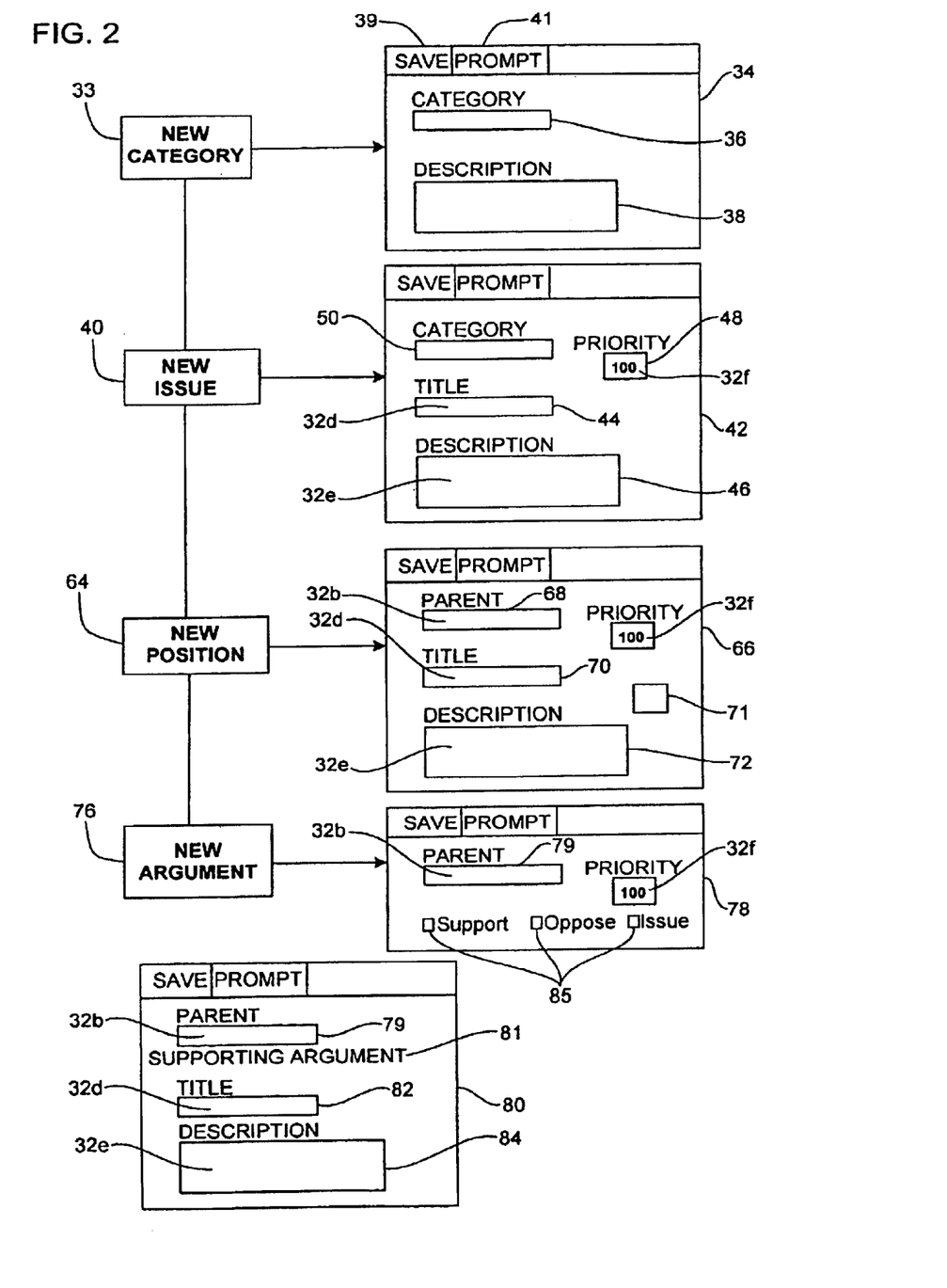
FIG. 2 is a flow chart showing the entry of text data by the user to represent particular ideas of: CATEGORY, ISSUE, POSITION, and ARGUMENT.

Referring now to FIG. 2, the program 30 of the present invention generally allows for the inputting of text data identifying ideas. As will be described below, the user may characterize each idea as a CATEGORY, an ISSUE, a POSITION and a SUPPORTING ARGUMENT or OPPOSING ARGUMENT. These different types of ideas have a natural order, that is, POSITIONS are responsive to ISSUES, and ARGUMENTS support or oppose POSITIONS. New ISSUES are subservient to POSITIONS or ARGUMENTS. Accordingly, the program will prompt the user for particular types of ideas 52 depending on a selected parent idea 52 as will be described below. Although not shown in FIG. 2, it will be understood that the dependency of ISSUE/POSITION/ISSUE maybe continued to infinite depth limited only by the capacity of the particular computer.

The data entry portion of the program 30 begins at a process block 33 in which the user is presented with a CATEGORY entry screen 34 allowing a CATEGORY to be entered. Generally a CATEGORY describes the general topic to which ideas to be generated relate, and is intended simply as a name under which to collect similar investigations for possible reuse or easy reference.

Using the keyboard 18 and/or mouse 20 according to well-understood graphic user interface conventions, the user may enter a new CATEGORY on the CATEGORY entry screen 34 presented on the graphic display screen 12. The CATEGORY entry screen 34 provides for the entry of a category name in CATEGORY name text-entry box 36 and a description of the CATEGORY in CATEGORY description text-entry box 38.

The CATEGORY entry screen 34 provides for a prompt button 41 which provides the user instructions or hints as to the appropriate data to be entered into the CATEGORY name text-entry box 36 and a save button that saves the entered data to the database 32 and closes the CATEGORY entry screen window upon completion.

As is understood in the art, each of the text-entry boxes described above and as will be described below, allows for text entry and rudimentary editing of that text according to techniques well known in the art as provided by the windows operating system. Further, each of the entry screens including that described above and hereafter will include the prompt and save buttons and these will not be described again. An example prompt might say to not construct ISSUES in terms of yes or no questions and might give sample formulations for question construction.

Once a CATEGORY has been entered at process block 33, the user must select (or enter) a top ISSUE. This selection process (for any ISSUE not just top ISSUES) is invoked by process block 40 which provides for an ISSUE entry screen 42 allowing entry of a title 32d of the ISSUE in ISSUE title text-entry box 44 and a description 32e of the ISSUE in ISSUE description text-entry box 46. While the preferred embodiment separates the title and description, it will be understood that these elements may in fact be combined without substantially diminishing the utility of the invention. A value number 32f may be entered in priority text-entry box 48 to distinguish this ISSUE in priority among other ISSUES of a similar hierarchical level as will be explained. The ISSUE entry screen 42 also provides a CATEGORY text-entry box 50 which initially holds the CATEGORY previously entered in process block 33 or the CATEGORY of a selected node (as will be explained below) but which may be changed so as to link the ISSUE to another CATEGORY. CATEGORY is shown to the user to confirm that the top-level issue is being added to the correct category.)

Figure 3:
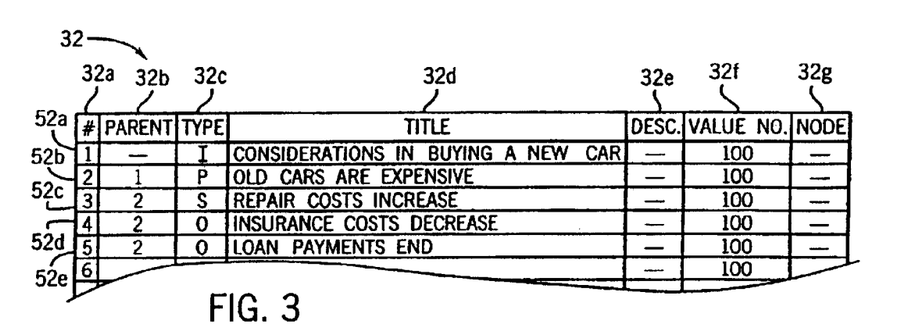
FIG. 3 is a fragmentary representation of a database receiving the data entered by the process of FIG. 2 showing a record structure holding the entered text data and its hierarchy by the recording of the entry's parent.

Referring now to FIG. 3, in an example use of this program, a new ISSUE may be entered as with the title: "Considerations in Buying a New Car". This title 32d is entered into a record of the database 32 having a record number 32a and defining generally an ISSUE idea 52a. A description 32e may also be optionally entered via the ISSUE description text-entry box 46 in like designated column of the record for the idea 52a, the description being additional text describing the ISSUE. The type 32c of ISSUE idea 52a as an ISSUE is also stored. Generally, one record or row of the database 32 will correspond to one idea 52.

Figure 4:
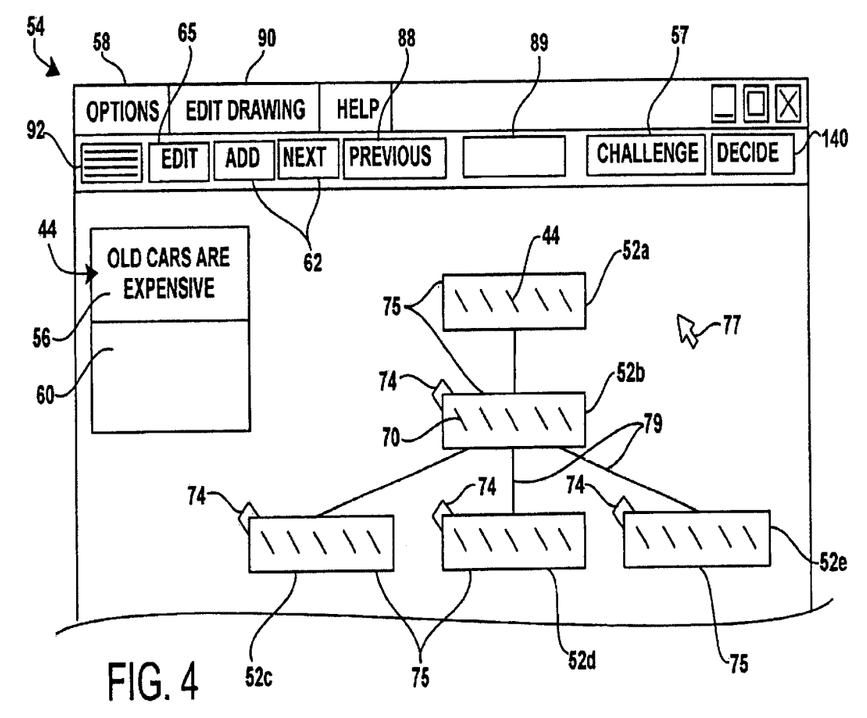
FIG. 4 is an example display on display of FIG. 1 showing a tree mode representation of the data of the database of FIG. 3.

Once an ISSUE idea 52a has been defined, the user may view the tree mode screen 54 as shown in FIG. 4. The ISSUE idea 52a appears as a box-shaped node 75 incorporating within it the title 32d of the ISSUE idea 52a. A text window 56 in the upper left-hand corner of the screen provides the title 33d in larger or more complete form to allow the representation of the ISSUE idea 52a by the node 75 to be compact. Optionally, according to an option menu 58, a description display window 60 may also be displayed, holding the description 32e previously entered in the ISSUE description text-entry box 46 associated with the ISSUE idea 52a. The description display window 60 and text window 56 will always reference a currently selected node 75 (the selection process to be described) to allow easy review of multiple nodes 75.

At this point, the user will typically use the tree mode screen 54 for further entry of ideas 52 using the ADD button 62. The type of idea (e.g., ISSUE, POSITION or ARGUMENT) is determined from the context of the tree mode screen 54 and, in particular, which node 75 is selected by the user. Selection of a node 75 (and its underlying idea 52) is accomplished by conventional techniques understood in the art by moving a cursor 77 to the particular text-entry box and activating a mouse button on the mouse 20. The node 75 is visually highlighted when it is selected. The cursor highlights the selected node by color, and highlights the parents and children nodes. Specifically, parents are highlighted with red; the selected node with yellow; and children nodes with blue in contrast to their normal black and white depiction.

If the node 75 selected relates to an ISSUE idea 52a (as is the case with this example), then when the ADD button 62 is pressed, the program will proceed to process block 64 as shown in FIG. 2 for adding of a new POSITION idea 52b, the only type of idea 52 that may be subservient to the selected ISSUE idea 52a. Invoking the ADD button 62, brings up POSITION entry screen 66 indicating a parent title 32d of parent ISSUE idea 52a, in a parent text-entry box 68, in this case the title of the top ISSUE: "Considerations In Buying A New Car". The user may enter a position title 32d in POSITION title text-entry box 70 (in this case "Old Cars Are Expensive") and a description 32e for this new POSITION idea 52b. The data entered for the POSITION idea 52b will form a second record in the database 32, as before, indicating the idea type (P for POSITION) and value number 32f (defaulting to 100 but which may be entered by the user) but unlike before, will also include an entry of a parent node 52a referencing by record number 52a parent ISSUE idea 52a. The polarity of the idea indicates whether the idea favors or disfavors the idea to which it is subservient and may be indicated by input box 71.

Referring now to FIGS. 4 and 3, the new node 75 for POSITION idea 52b will appear in the tree mode screen 54 including a colored indicia 74 indicating that the POSITION idea 52b is that of a POSITION. A selection of node 75 of POSITION idea 52b using the mouse 20 promotes its title: "Old Cars Are Expensive" into the text window 56. The hierarchy of the nodes of ISSUE idea 52a and POSITION idea 52b are shown by line 79 connecting particular idea-identifiers 52 and by the colors of the boxes surrounding the selected node.

This node 75 may be dragged using the mouse 20 to any position on the tree mode screen 54 while being visually connected by branch line 79. Children nodes 75, representing those ideas 52 in the database 32 referring to a parent 32b by record number 32a, are always shown lower in the diagram (by default) of tree mode screen 54 than their parent nodes 75, but may otherwise be freely moved about the screen by clicking and dragging according to well known conventions in graphical user interfaces. When the node 75 is dropped, the new coordinates for the node 75 are stored in the database 32 as the node coordinates 32g. In this way, a reading of the database 32 may always allow depiction of the latest tree diagram in the tree mode screen 54.

If a new POSITION idea 52b is to be added under the top ISSUE of ISSUE idea 52a, the ADD button may again be pressed and a new POSITION enrolled at the same hierarchical level as the POSITION of idea 52b. In this example, however, the POSITION idea 52b is selected and upon pressing the ADD button 62, process block 76 is invoked to allow the entry of data for an ARGUMENT idea 52c relating to ARGUMENTS or another ISSUES idea 52a.

In this case, a selection entry screen 78 appears showing the parent 32b in the context of the selection of POSITION idea 52b, in the title, "Old Cars Are Expensive," and allowing selection of either a SUPPORTING ARGUMENT, OPPOSING ARGUMENT, or a new ISSUE by radio buttons 85. A value number 32f may also be entered at this screen.

If a SUPPORTING ARGUMENT is selected, the program provides SUPPORTING ARGUMENT entry screen 80 indicating again the title 32d of the parent "Old Cars Are Expensive" and showing the text "SUPPORTING ARGUMENT" 81 and allowing placement of a new argument title 32d in SUPPORTING ARGUMENT title text-entry box 82 and description 32e in SUPPORTING ARGUMENT description text-entry box 84 as is generally shown above.

In the present example, three ARGUMENT ideas 52c–e are then added beneath POSITION idea 52b using this or a similar entry screen, each occupying a common hierarchical level as result of common dependency on common POSITION idea 52b. Corresponding nodes 75 appear at a single level beneath the node 75 of POSITION idea 52b, however, the locations of these nodes 75 may be freely changed as described above.

Specifically, and referring to FIG. 3, ARGUMENT idea 52c shows its dependency on POSITION idea 52b by listing as a parent 32b record number two (that of POSITION idea 52b). ARGUMENT idea 52c has a type 32c of "SUPPORTING ARGUMENT" (represented by an S) indicating that it supports the POSITION idea 52b that "Old Cars Are Expensive" and has the title of "Repair Costs Increase".

The two OPPOSING ARGUMENTS of idea 52d and idea 52e enrolled in records number four and five of the database 32 have the titles 32d of "Insurance Costs Decrease" and "Loan Payments End". Similar data shows their type 32c and parent 32b.

Referring now to FIG. 4, although ideas 52c, 52d and 52e occupy a single level of the hierarchy, they may have different indicia 74 typically being different colors indicating whether they are OPPOSING ARGUMENTS or SUPPORTING ARGUMENTS. Thus the general relationship of the ideas 52 to other ideas is easily viewed and multiple types of relationships may be indicated, not just the dominant/subservient relationships of an outline.

Referring again to FIG. 4, an edit button 65 allows editing of any selected node 75 meaning editing of the record of the underlying idea 52 in the database 32. The edit button 65 allows general text editing including deletion and insertion of characters and the like into the title 32d and description 32e. A next button 67 moves one through the hierarchy in a level-by-level left to right sequence by moving down the records of the database 32. Previous button 88 moves one backward in the hierarchy or moving up the records. A menu item 90 allows editing of various features of the drawings including lining up rows evenly and shortening lines 79. Navigation through the tree is also provided by the computer keyboard arrow keys (up, down, left and right).

In the tree mode screen 54, a challenge button 57 may be activated whenever a POSITION node 75 or an ISSUE node is selected. The challenge button 57 in its simplest embodiment provides a set of predefined supporting or objecting arguments helping the user to determine what possible arguments might be applied against a given POSITION or positions applicable to a particular ISSUE. For example, the challenge button may produce a list (not shown) of arguments having to do with cost impact, environmental impact, and other questions regarding a POSITION. Checking one of these open-ended questions will import the text of the question into the title block of a new ARGUMENT entry screen 80 that may be edited by the user.

Figure 5:
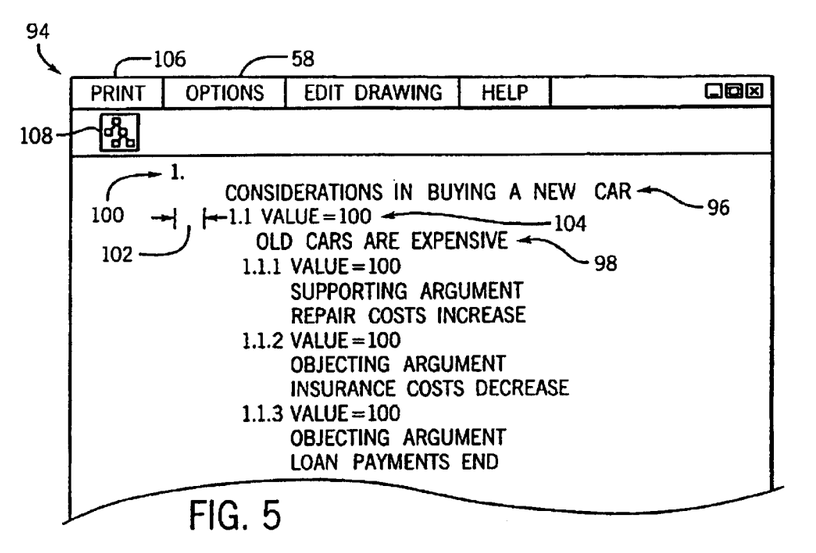
FIG. 5 is a figure similar to that of FIG. 4 showing an outline version of the same data of FIG. 3.

Referring still to FIG. 4, an outline may be generated of data of the database 32 collected using tree mode screen 54 by pressing a text outline symbol icon 92. Referring to FIG. 5, the outline mode screen 94 displays the titles 32d of the ideas 52 representing parent nodes as paragraphs 96 and the titles of children nodes as subparagraphs 98 beneath the paragraphs 96 and indented from those subparagraphs 98. The outline may be displayed or printed in its entirety, or individual layers, subtrees, or ideas may be printed and/or displayed. Subparagraphs 98 may be further placed under other subparagraphs 98 indented therefrom in the same way that children nodes may be parents to other children nodes. Standard outline numbering 100 is provided for the paragraphs.

The value number 32f noted above and representing the priorities or importance of ideas 52 is displayed above the paragraphs 96 and subparagraphs 98 of a given level in the hierarchy (thus having the same level of indenting) and the paragraphs 96 and subparagraphs 98 of a given level are arranged in order according to the value number 32f. The indicia 74 of the nodes 75 in the tree mode screen 54 become text labels such as: "SUPPORTING ARGUMENT", "OBJECTING ARGUMENT" or "ISSUE" in the outline mode screen 94 and the outline may be printed by invoking a print menu item 106. The outline, composed only of standard typographical characters may be easily stored, transmitted and reproduced by others using a common file structure such as rich text format (RTF), Hypertext Markup Language (HTML) or Extensible Markup Language (XML), well known in the art.

Pressing a tree icon 108 returns the user to the tree mode screen 54. In yet another embodiment of the invention, both the tree mode screen 54 and outline mode screen 94 may be shown simultaneously on a split screen. In this case, a synchronous cursor may move between paragraphs and nodes to provide a matching of different elements of the two documents.

Adjusting Value Numbers

Figures 6, 7:
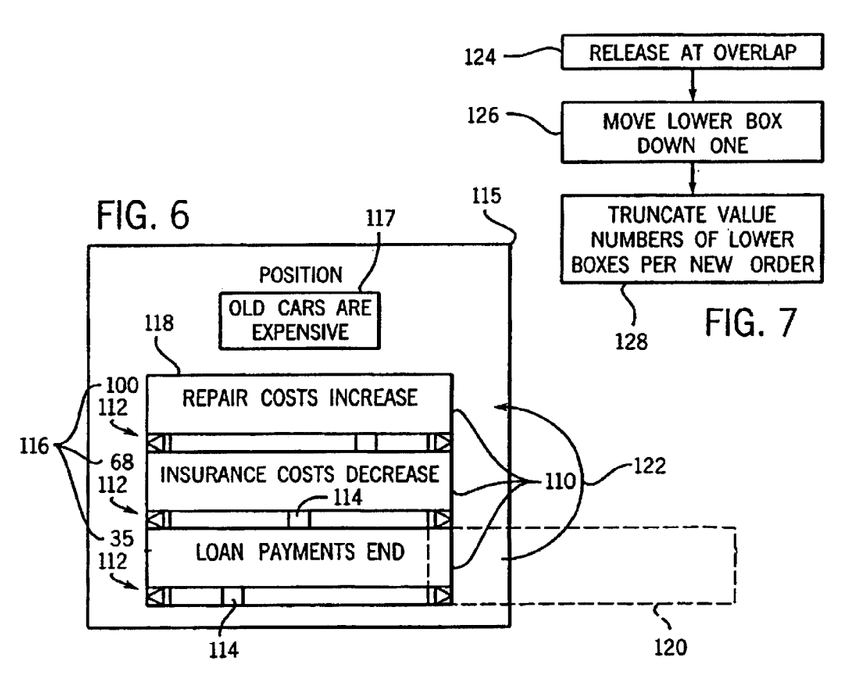
FIG. 6 is a representation of a display of a prioritizing list box control for inputting priority data associated with the idea-identifiers entered in the process of FIG. 2.
FIG. 7 is a flow chart showing operation of the program of the present invention in adjusting priorities according to manipulation of the list box of FIG. 6 by the user.

In either of the tree mode screen 54 or outline mode screen 94, the option menu 58 or priority button 89 may be used to obtain and adjust the value numbers 32f using a priority window 115 shown in FIG. 6. This priority window 115 is only available if an idea 52 has been selected having peer ideas 52 of a same hierarchical level. In this case, each of the titles 32d of the peer idea-identifier 52 are shown in successive text list boxes 110 in the priority window 115 showing the parent POSITION 117. The text list boxes 110 are arranged in a linear order denoting priority per the value number 32f associated with the idea 52 of the text list box 110. Each of the text list boxes 110 further includes a slider bar 112 having a slider element 114 that may be moved left or right so as to change the value numbers 32f associated with the idea 52 of the given text list boxes 110 as displayed in the upper left hand corner by numerals 116.

Changes of the value numbers 32f using the priority window edit the underlying database 32. Value numbers 32f of ideas 52 of a same hierarchical level may be readily changed in one of two ways. In the first way, a particular text list box 110 is selected and dragged by means of the mouse 20 according to techniques well known in the art producing a phantom outline 120. The phantom outline 120 may be repositioned on another text list box 110 as shown by arrow 122. When it is released as shown in FIG. 7 at process block 124, then at succeeding process block 126, the program 30 moves the existing text list boxes 110 down one in the list so as to change their relative priorities.

At process block 128, the value numbers 32f of each of the reorganized text list boxes 110 are adjusted so that the value numbers 32f of lower text list boxes 110 are truncated at the value numbers 32f of the upper text list boxes 110. Thus, for example, if the middlemost text list boxes 110 related to an idea 52 having a value number 32f of sixty-eight is placed at the top of the list, the topmost text-entry box having a priority of one-hundred moves down one position and has its priority truncated to sixty-eight. This truncation simply reviews the records of the database 32 after each such move and tests and truncates the value numbers 32f against a collected maximum. A similar process takes place when you move an item down the list. The system insures that the values above the item are raised.

This truncation process also occurs when the slider elements 114 are used so that the slider elements 114 of all lower text list boxes 110 follow the slider element 114 above them as that slider element aligns with them as that slider element 114 is moved to the left to produce a lower priority number. Any priority numbers of lower text list boxes 110 that would be higher than the current value imposed by the slider element 114 on the upper text-entry box are also moved to remain at least equal and no greater than that numerical priority. Similarly, if the slider is moved up, the system automatically adjusts the value of higher priority items up. This two-step process of ordering and valuing provides a simple and intuitive mechanism for prioritizing data superior to just valuing the data insofar as it gives the user a comprehensive graphical interface.

The value numbers 32f cause an automatic rearrangement of the subparagraphs in order of their priority when the outline mode screen 94 is shown and can reorder the nodes of the tree mode (in the relevant level) on a left to right basis.

As used herein, it will be understood that the terms dominant/subservient and parent/child are relative terms and that, for example, parent nodes may be children to other nodes, and children nodes may be parents to other nodes per conventional usage.

Once a database 32 is created, it may be saved and recalled for further use. In this way, generic databases for particular problems may be created and provided to the user to serve a framework for their particular problems. A directory of databases is provided for this purpose and standard-editing tools described above may be used to fit these to a particular problem. It is envisioned that a comprehensive set of such framework databases will eventually come into existence based on this tool such as may be traded and even bought and sold between users.

Quantitative Evaluation of the Hierarchical Ideas

Figure 8:
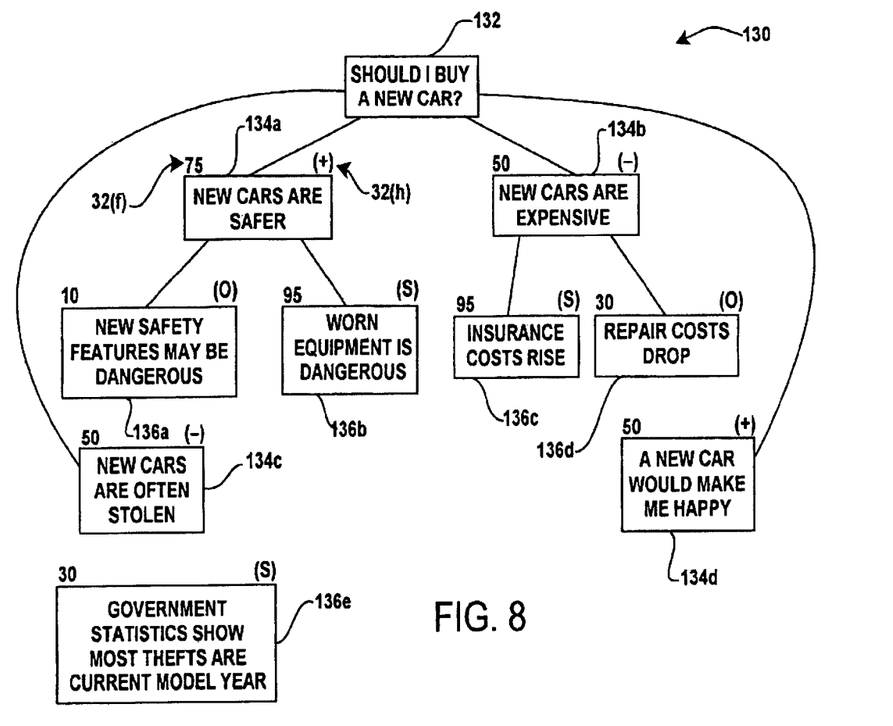
FIG. 8 is figure similar to that of FIG. 4 showing a tree diagram with assigned priorities and identification of argument types.

Referring now to FIG. 8, a logical tree 130 developed by the invention may have a topmost issue 132 of: "Should I Buy a New Car?".

A number of positions 134a–134d may be established subservient to the issue 132. Each of the positions 134a–134d may be given a value number 32f indicating its relative importance with respect to other positions 134a–134d of that level and, optionally, a polarity 32h (an additional column in the database 32 but not shown) indicating whether it supports or opposes the topmost issue as it is framed.

For the purpose of the following description, the value numbers 32f are shown in FIG. 8 by numbers to the upper left hand corner of the boxes containing the positions 134a–134d and the polarity 32h is shown by a plus or minus sign to the upper right of the box of the positions 134a–134d. Generally, whether a position supports or opposes the issue depends on the framing of the issue. In this case, positions that support buying a new car are indicated by a plus sign as supporting, whereas positions indicating that a new car should not be purchased are indicated by a minus sign.

In the example, the first position 134a is that "NEW CARS ARE SAFER" and this is given a value number 32f of 75 and is a supporting or plus polarity 32h.

Issue 134b is that "NEW CARS ARE EXPENSIVE". A value number 32f of 50 is given to this position and it is a minus sign polarity 32h. As is intuitive, 50 indicates that this position 134b has less significance in the user's mind than position 134a and is a magnitude, that is, independent of whether the issue of 134b is supporting or opposing.

Position 134c is that "NEW CARS ARE MORE OFTEN STOLEN". This has been given a value number 32f of 50 and is a minus sign polarity 32h.

Position 134d is that a "NEW CAR WOULD MAKE ME HAPPIER". This is also given a value number 32f of 50 and is a positive polarity 32h.

A quantitative decision based on these value numbers 32f could be produced with respect to the issue 132 at this time. However, the present invention also allows a further level of supporting and opposing arguments 136 beneath supporting and opposing positions 134a–134d. In this case, five arguments are provided: 136a through 136e with arguments 136a and 136b being subservient to position 134, arguments 136c and 136d being subservient to position 134b and argument 136e being subservient to position 134c. There are no arguments subservient to position 134d.

Argument 136a is the opposing argument: "NEW SAFETY FEATURES MAY BE DANGEROUS". An opposing argument is indicated by the "O" symbol to the upper right hand corner of the block depicting argument 136a. Argument 136a is given a value number 32f of 10 indicated by the number to the upper left hand corner of that block.

Argument 136b is the supporting argument: "WORN EQUIPMENT IS DANGEROUS" given a value number 32f of 95. A supporting argument is indicated by the "S" symbol to the upper right hand corner of the block depicting argument 136b.

Argument 136c is a supporting argument: "INSURANCE COSTS RISE", which is given a value number 32f of 95.

Argument 136d is an opposing argument "REPAIR COSTS DROP" given a value number 32f of 30. Argument 136e is a supporting argument: "GOVERNMENT STATISTICS SAY MOST THEFTS ARE CURRENT MODEL YEARS" given a value number 32f of 30.

Figure 9:
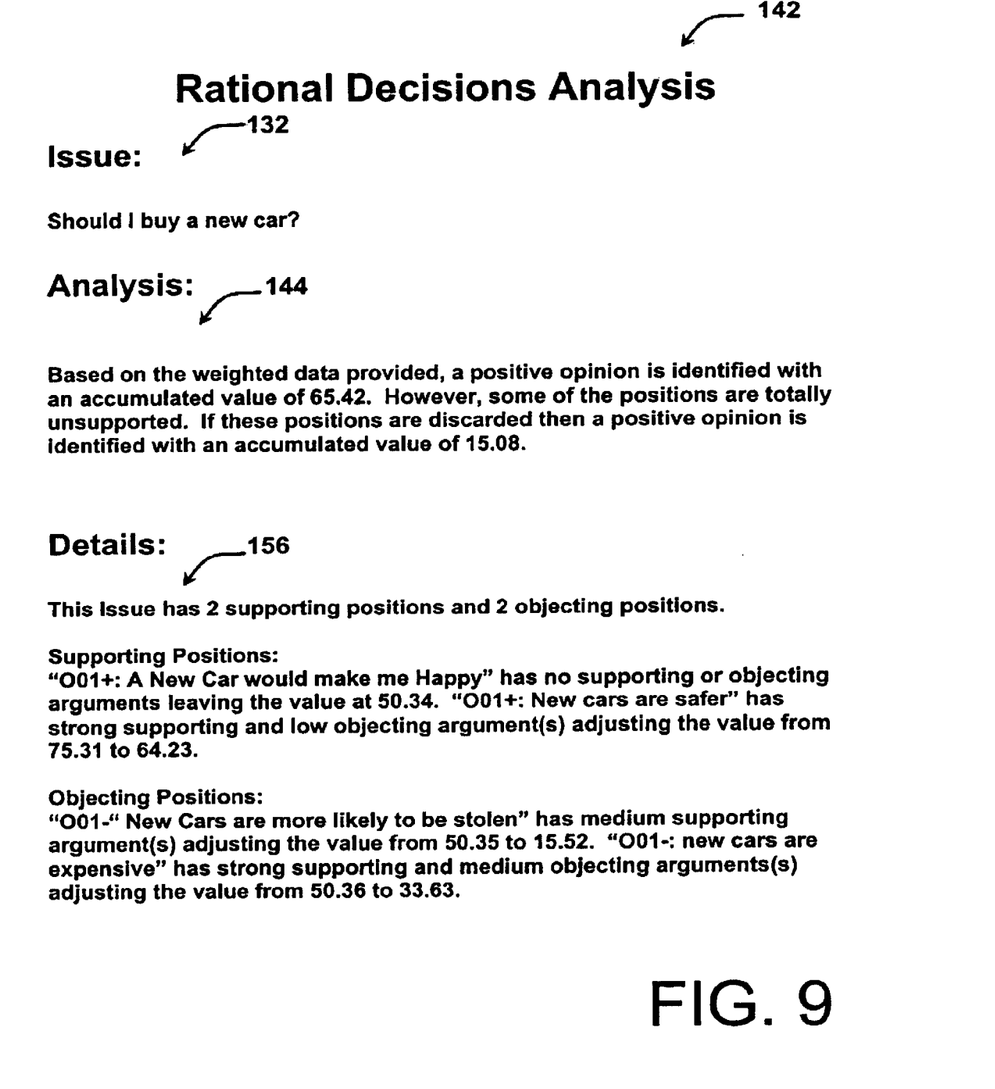
FIG. 9 is a report generated from the tree diagram of FIG. 8 showing the application of the number values to produce a calculated priority.

Referring now to FIG. 3, once value numbers 32f have been established in the manner described with respect to FIG. 2 for FIGS. 6 and 7 or through the editing button 65 shown in FIG. 4, a decision button 140 may be pressed to produce a report 142 shown in FIG. 9. The report describes the issue 132 and then performs an analysis 144 in which quantitative guidance is provided with respect to the issue 132 as to whether a new car should be purchased.

Figure 10:
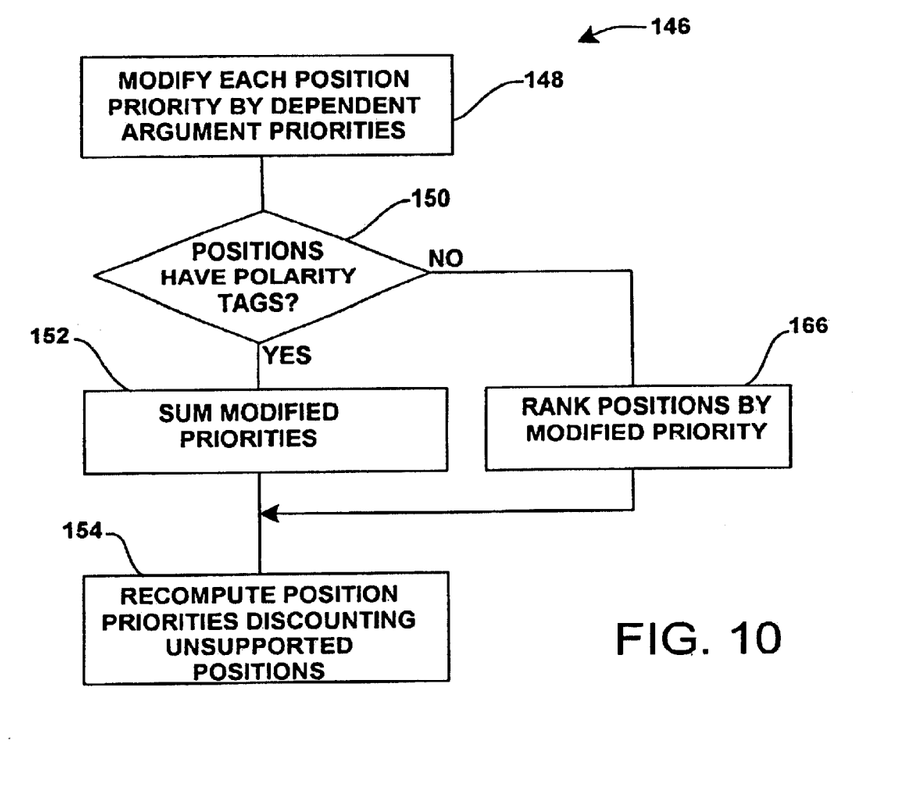
FIG. 10 is a flow chart showing the steps implemented by the program of the present invention in computing numeric priorities.

Referring now to FIG. 10, the quantitative guidance provided in the analysis 144 is produced by a series of processing calculation steps 146 beginning at process block 148 in which the value number 32f of each position 134 is modified by its subservient arguments 136. This process may be recursive so that arguments 136 may have positions beneath them and there may be arguments beneath those positions following the same procedure as will not be described.

The modification of a value number 32f of a position 134 is performed by multiplying that value number 32f times the value number 32f of its supporting arguments 136 taken as a percentage and by one minus the value number 32f of its opposing arguments 136 where those value numbers 32f are also taken as a percentage. Thus, for example, for position 134a, its modified value number 32f is equal to: 75(0.95) (1−0.1).

Thus, the modified value number 32f of position of 134a is 64.23.

A similar calculation performed with respect to position 134b produces an adjusted value of 33.63.

Similarly, position 134c produces an adjusted value of 15.52. Position 134d retains its value number 32f of 50.

Referring again to FIG. 10, at decision block 150, the program determines whether positions 134 are tagged to indicate polarity 32h. This tagging can be done at window 66 through block 71. If they are so tagged, this indicates that the problem is cast not as a selection among competing positions 134a through 134d, but as an evaluation of the overarching issue 132. Accordingly, at process block 152, the adjusted value number 32f computed at process block 148 for each of the positions 134a through 134d are added together. If the sum is positive, the issue 132 is supported. If the sum is negative, the issue 132 is not supported. The magnitude of the number is an indication of the strength of the answer.

Referring again to FIG. 9, it will be seen that in this example, the issue 132 is supported with an accumulated value of 65.42 representing the sum of the modified value numbers 32f of each of the positions 134a through 134d. A detail section 156 provides a breakout of the numbers for each of the positions 134a through 134d.

Referring again to FIG. 10, at process block 154, the calculations are done a second time, eliminating all positions 134 that have no supporting or opposing arguments 136. This calculation is added to the analysis 144 and to the details 156.

Figure 11:
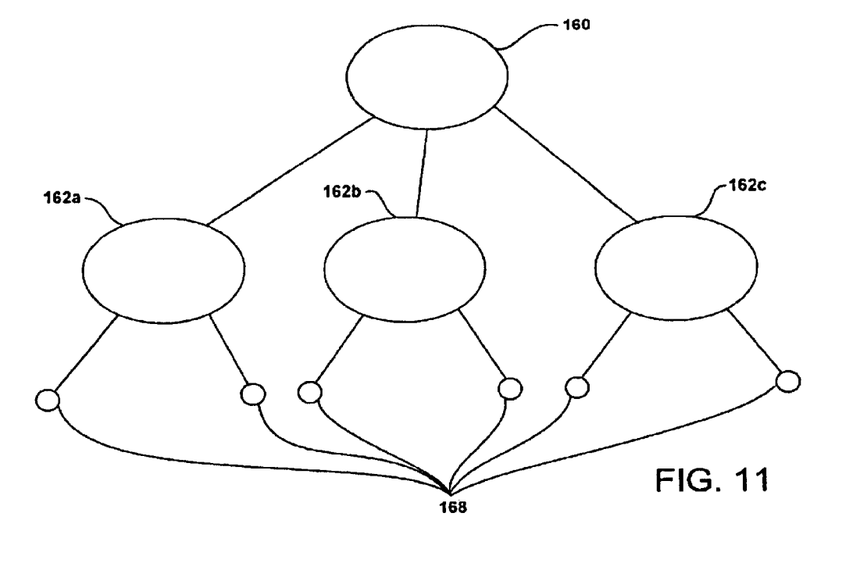
FIG. 11 is a simplified tree diagram showing application of the invention to selection among a number of alternatives.

Referring now to FIG. 11, a topmost issue 160 may in fact call for a choice among alternatives, for example: "WHAT CAR SHOULD I PURCHASE" where the alternatives are represented by the positions 162a, 162b, and 16c. Here the positions 162a through 162c are not tagged with polarities 32h (by election of the user) as being supporting or opposing arguments. Accordingly, when the value numbers 32f of the positions 162a through 162c are calculated per decision block 166 of FIG. 10, the value numbers 32f are not added but instead compared to identify that position having the most positive number based on the modification by its arguments 168.

Application to Control Processes

It will be apparent to one of ordinary skill in the art, from the foregoing description, that the present invention provides one or more numeric outputs (related to an ISSUE or to one or more POSITIONS) based on inputs which come from subservient POSITIONS or subservient supporting or opposing ARGUMENTS each of which may have be assigned quantitative weights per the mechanisms described above. The inputs are combined as described above according to their tree-structure hierarchy in a simple and intuitive manner.

This framework providing outputs subservient to inputs can also be used for direct process control of automation and the like where the output numeric values are translated into proportional electrical signals and the inputs are obtained from electrical signals from sensors or other input devices and not necessarily entered by a human operator. In this application, the present invention provides an intuitive programming language where the programming is in terms of weightings of competing hierarchical interests.

In a first embodiment, the present invention may provide a fixed of hierarchical ideas (e.g., ISSUES, a POSITIONS and a SUPPORTING ARGUMENTS or OPPOSING ARGUMENTS linked to each other) and the weightings may be varied. In this embodiment, a CATEGORY may not be necessary. Alternatively, the weightings and hierarchy may be varied.

In this application, more complex control algorithms may be obtained by allowing "feedback paths" from outputs to inputs, that is, from ISSUES or POSITIONS back down to SUPPORTING ARGUMENTS, with the weighing of the SUPPORTING ARGUMENT being modified by the feedback value from the ISSUE or POSITION. Similarly, the co-joining of the weighting of inputs may be allowed, for example, so that a change in the weighting of one SUPPORTING ARGUMENT will cause an automatic and equal change of the weighting for another SUPPORTING ARGUMENT. These features may also be used for the invention outside of a control application to allow more complex hierarchical formulations.

In implementation, a control system using the present invention may be implemented on a standard personal computer or on a programmable logic controller supporting a terminal for programming. Alternatively, the control system may be developed on such a device and then embedded in simpler device such as a programmable logic array or a micro controller or similar control device.

It is specifically intended that the present invention not be limited to the embodiments and illustrations contained herein, but modified forms of those embodiments including portions of the embodiments and combinations of elements of different embodiments as come within the scope of the following claims.

I claim:

1. A program for the organization of ideas using an electronic computer, the electronic computer having a user input device and a graphics display, the program comprising instructions executed on the electronic computer to:
   (i) accept text-identified ideas from the user via the user-input device;
   (ii) accept at least one idea hierarchy instructions from the user via the user-input device, the hierarchy instructions relating the accepted ideas in dependencies;
   (iii) display representations of the ideas as organized into levels defined by common dependency:
   (iv) accept from the user numeric weights for the ideas; and
   (v) indicate calculated weights of at least one upper idea being the weight of the upper idea modified by the weight of at least one lower ideas subservient to the upper idea.

2. The program of claim 1 wherein the at least one upper idea is a proposition and the calculated weight indicates whether the proposition is supported or not by the lower ideas subservient to that proposition, based on the numeric weights of those subservient ideas.

3. The program of claim 1 wherein the at least one upper idea may be a set of propositions of equal level in the hierarchy and the calculated weights indicates which proposition of the set is best supported by the lower ideas subservient to that statement based on the numeric weights of those subservient statements.

4. The program of claim 1 further including instructions accepting from a user an indication as to whether a lower idea is supporting or opposing an upper idea on which it is subservient.

5. The program of claim 4 wherein the program at step (v):
   (1) indicates whether a single upper idea is supported or not by the lower ideas subservient to the upper idea, only if the lower ideas subservient to the upper idea are marked as favoring or disfavoring ideas, and
   (2) otherwise indicates which of a set of given set of upper ideas of equal level in the hierarchy is best supported by the ideas subservient to that upper idea.

6. The program of claim 1 wherein the calculated weight multiplies the weights of the at least one upper idea by factors based on the weights of lower ideas subservient to the upper idea.

7. The program of claim 6 wherein the numeric weights are percentages and the calculated weight multiplies the weights of the at least one upper idea by the percentage numeric weights of any supporting lower ideas subservient to the upper idea and by one minus the percentage of any numeric weights of the opposing lower ideas.

8. The program of claim 6 wherein the numeric weights are percentages and the calculated weight is a product of the weights of the at least one upper idea and all percentage numeric weights of the supporting lower ideas subservient to the upper idea and by one minus the percentage of the numeric weights of the opposing lower ideas for all opposing lower ideas.

9. The program of claim 4 wherein the weights of the supporting and opposing lower ideas are previously modified by the weights of the ideas subservient to the supporting and opposing lower ideas.

10. The program of claim 1 wherein the electronic computer further:
    (v) indicates calculated weights of at least one upper idea as the numeric weight of the upper idea modified by the weight of at least one lower idea only when the lower idea also has a subservient idea.

11. The program of claim 10 wherein the program modifies weights entered by the user when two weights having a common dependency are the same, by adding a predetermined increment to one of the weights.

12. The program of claim 1 wherein the text identified ideas are displayed in a text outline according to the dependencies of ideas associated with the text, the text outline including paragraphs arranged beneath other paragraphs on which they depend; and wherein the paragraphs of a level are ordered according to the weights of the ideas to which they are related.

13. The program of claim 1 wherein the text identified ideas are displayed in a tree according to their dependencies, the tree including branches visually connecting node symbols to other node symbols on which they depend; and wherein the nodes of a level are ordered according to the weights of the ideas to which they are related.

14. The program as recited in claim 1 wherein the computer further executes the stored program to provide a list of representations of text identified ideas of a given level in the hierarchy and wherein weights are assigned by the user by changing the order of the representations of identified ideas within the list.

15. The program as recited in claim 14 wherein the computer further executes the stored program to allow changing of order of representations of identified ideas by selection of a given representation of an identified idea as displayed on the graphics display using the user input device and moving the representations of the identified idea within the list as displayed on the graphic display device using the user input device.

16. The program as recited in claim 5 wherein the computer further executes the stored program so that when the representation of an identified idea is moved within the list to modify the weight of at least one idea identifier so that the weights of all identified ideas in the list remain monotonically decreasing.

17. The program as recited in claim 1 wherein the computer further executes the stored program to provide a list of representations of text identified ideas of a common hierarchical level and to display a slide control for each identified idea in the list that may be manipulated by the user input device to enter the number weight value.

18. The program as recited in claim 17 wherein the computer further executes the stored program to decrease the number weight value of all specific text identified ideas in the list to beneath a given identified idea to a value less than the value of the given identified idea.

19. The program as recited in claim 17 wherein the computer further executes the stored program to increase the value of the number weight value of all specific identified ideas in the list above a given identified idea to a value at least equal to the value of the numeric weight of the specific identified idea.

* * * * *